United States Patent [19]
Hiwatashi et al.

[11] Patent Number: 5,700,073
[45] Date of Patent: Dec. 23, 1997

[54] BRAKING FORCE CONTROL SYSTEM AND THE METHOD THEREOF

[75] Inventors: Yutaka Hiwatashi, Isesaki; Koji Matsuno, Ota; Akira Takahashi, Ota; Munenori Matsuura, Ota, all of Japan

[73] Assignee: Fuji Jukogyo Kabushiki Kaisha, Tokyo, Japan

[21] Appl. No.: 681,525

[22] Filed: Jul. 23, 1996

[30] Foreign Application Priority Data

Sep. 11, 1995 [JP] Japan ................................ 7-232784

[51] Int. Cl.$^6$ ........................................ B60T 8/58
[52] U.S. Cl. .................. 303/146; 303/140; 303/142; 303/148; 180/197
[58] Field of Search .................. 303/146, 147, 303/148, 149, 140, DIG. 6; 364/426.017, 426.015, 426.016, 426.01, 424.051, 426.03, 426.035, 426.034; 180/197

[56] References Cited

U.S. PATENT DOCUMENTS

| | | | |
|---|---|---|---|
| 4,898,431 | 2/1990 | Karnopp et al. | 303/146 |
| 4,998,593 | 3/1991 | Karnopp et al. | 303/146 |
| 5,229,944 | 7/1993 | Yasuno | 303/146 |
| 5,251,137 | 10/1993 | Chih et al. | 303/DIG. 6 |
| 5,259,476 | 11/1993 | Matsuno et al. | 180/197 |
| 5,265,020 | 11/1993 | Nakayama | 180/197 |
| 5,275,475 | 1/1994 | Hartmann et al. | 303/146 |
| 5,515,275 | 5/1996 | Ackermann | 303/147 |
| 5,576,959 | 11/1996 | Hrovat et al. | 303/146 |
| 5,584,541 | 12/1996 | Sone et al. | 303/140 |
| 5,620,239 | 4/1997 | Mihara et al. | 303/147 |

*Primary Examiner*—Douglas C. Butler
*Attorney, Agent, or Firm*—Beveridge, DeGrandi, Weilacher & Young, LLP

[57] ABSTRACT

A braking force control system and method of a vehicle comprises an estimated yaw rate calculating section for calculating an estimated yaw rate on a road surface having low friction coefficient, a target yaw rate differential calculating section for calculating a target yaw rate differential, an estimated yaw rate differential calculating section for calculating an estimated yaw rate differential, a yaw rate differential deviation calculating section for calculating a deviation of the both differentials, a first target braking force calculating section for calculating a first target braking force, a yaw rate deviation calculating section for calculating a deviation of an actual yaw rate and a target yaw rate, a second target braking force calculating section for calculating a second target braking force, a final target braking force calculating section for calculating a final target braking force based on the first and second target braking forces. When an output judging section judges that the deviation of the actual yaw rate and the target yaw rate is in the control zone, a brake signal is outputted to a brake drive section so as to apply the final target braking force to a braking wheel selected in a braking wheel determining section, whereby the vehicle can make a smooth and stable turn without causing spins or drift-outs during cornerings.

10 Claims, 7 Drawing Sheets

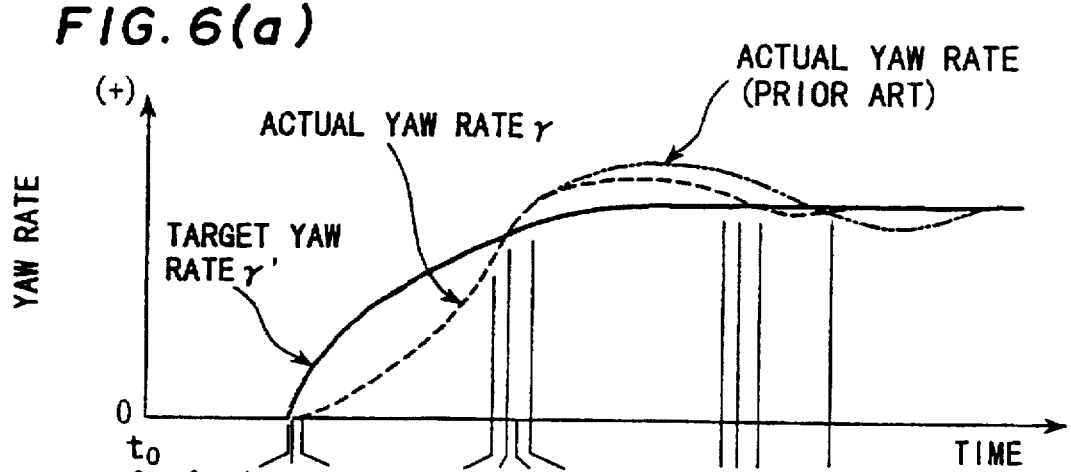
FIG.6(a)
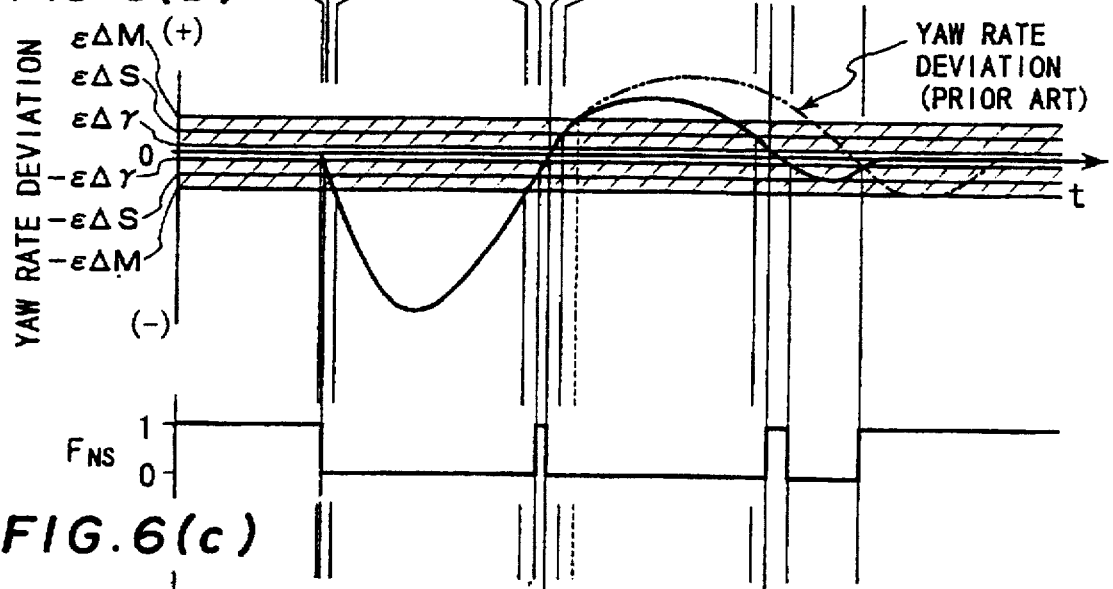
FIG.6(b)
FIG.6(c)
FIG.6(d)
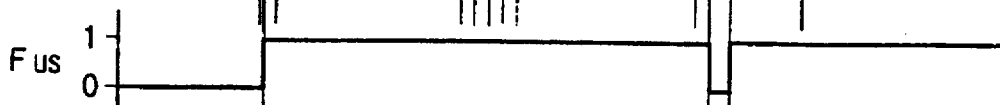
FIG.6(e)
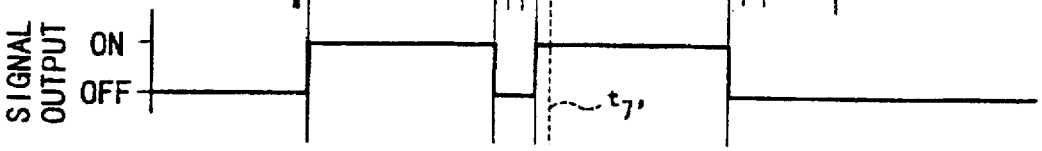
FIG.6(f)

BRAKING FORCE CONTROL SYSTEM AND THE METHOD THEREOF

BACKGROUND OF THE INVENTION

1. Field of the Invention

The present invention relates to a braking force control system and method of a vehicle for properly applying braking force to wheels so as to make a stable and smooth turn at cornerings.

2. Prior Arts

Recently, due to an increasing concern about vehicle safety, so many techniques for safe driving have been developed. Among them, there are several proposed technologies in which when a vehicle turns corners an optimally controlled braking force is applied to wheels based on vehicle driving conditions data for accomplishing a stable and smooth cornering of the vehicle.

For example, Japanese Unexamined Patent Application Toku-Kai-Hei 2-70561 discloses a braking force control apparatus for controlling braking force on the basis of a yaw rate or an angular velocity of yawing, i.e., a rotational motion about a vertical axis passing through a center of gravity of the vehicle. In this technology, it is judged whether the vehicle is turning in an under-steer condition or in an over-steer condition with respect to a target yaw rate by comparing an actual yaw rate with the target yaw rate and if the vehicle is in under-steer a braking force is applied to inner wheels (wheels on the side of a turning center) to correct under-steer such that a deviation of the actual yaw rate from the target yaw rate is minimized and if in over-steer braking force is applied to outer wheels (wheels on the opposite side of a turning center) to correct over-steer.

Conventionally, to avoid an unnecessary control of the vehicle, when this yaw rate deviation is small, a noncontrol zone is established so as to suspend control in a condition below a specified value of the yaw rate deviation. That is, if the control is continued to be executed while the yaw rate deviation is small, the braking force control is applied to the vehicle even when a vehicle operator is able to correct the vehicle behavior easily. Because of this, the vehicle operator may have an awkward feeling in the vehicle behavior and in some case he or she may feel confusion about how to control the vehicle. Further, the frequent use of brakes incurs an increase of wears of the brake components. Consequently, in conventional braking force control systems there is provided with a noncontrol zone in which the braking force control is suspended.

However, the braking force control system including a noncontrol zone has a disadvantage in that, depending upon vehicle running conditions, the control is frequently switched from an on-control to an off-control condition and vice versa and as a result of this the vehicle operator may feel a discontinuity of control each time of switching from on-control to off-control and vice versa. To solve this problem, in addition to establishing an optimal noncontrol zone, raising a responseability and follow-up characteristic of the control is essential.

Further, the aforementioned technology has a problem of control delay because the control is executed according to the detected actual yaw rate. As an example of technologies disclosed to solve this problem, Japanese Unexamined Patent Application Toku-Kai-Hei 3-112756 proposes a technology in which the control is performed so as to equalize the variation amount of the target yaw rate calculated based on the variation of the steering amount and the vehicle speed with the variation amount of the actual yaw rate detected.

However, since this variation amount of the actual yaw rate which is detected as a difference between a signal of the previous actual yaw rate and a signal of the present actual yaw rate has a very small value easily affected by miscellaneous noises, the control only by the variation amount of the actual yaw rate brings a problem of reliability to the control system.

Further, in applying braking force to wheels, in case where the rear wheel is selected as a braking wheel, the value of braking force calculated based on the vehicle operational conditions and the yaw rate deviation secures the rear wheel a stable braking operation when the vehicle runs on a road with a surface having high friction coefficient, however on a road with a surface having low friction coefficient there is a likelihood that the vehicle loses a stability due to slips at the rear wheel. Further, in calculating braking force to be applied to the rear wheel, if this braking force is calculated according to the same gain as that of the braking force of the front wheel and is applied to the rear wheel, a head turn moment of the vehicle becomes so strong that the vehicle operator may have an awkward feeling in the vehicle behavior.

SUMMARY OF THE INVENTION

Accordingly, the present invention is intended to obviate the disadvantages of the known braking force control system and it is an object of the present invention to provide a braking force control system capable of controlling the vehicle with a natural behavior so as to secure a vehicle running stability.

A braking force control system according to the present invention comprises:

vehicle speed detecting means for detecting a vehicle speed;

steering angle detecting means for detecting a steering angle;

target yaw rate gain calculating means for calculating a target yaw rate gain based on the vehicle speed;

actual yaw rate detecting means for detecting an actual yaw rate;

target yaw rate calculating means for calculating a target yaw rate based on the vehicle speed, the steering angle and the target yaw rate gain;

estimated yaw rate gain calculating means for calculating an estimated yaw rate gain based on the vehicle speed;

estimated yaw rate calculating means for calculating an estimated yaw rate under an estimated running condition based on the estimated yaw rate gain and the steering angle;

target yaw rate differential calculating means for calculating a target yaw rate differential;

estimated yaw rate differential calculating means for calculating an estimated yaw rate differential;

yaw rate differential deviation calculating means for calculating a yaw rate differential deviation of the target yaw rate differential and the estimated yaw rate differential;

first target braking force calculating means for calculating a first target braking force for the front wheel and a first target braking force for the rear wheel respectively based on the yaw rate differential deviation;

yaw rate deviation calculating means for calculating a yaw rate deviation of the actual yaw rate and the target yaw rate;

second target braking force calculating means for calculating a second target braking force for the front wheel and a second target braking force for the rear wheel respectively based on the yaw rate deviation, the steering angle, the target yaw rate gain, the vehicle speed and the actual yaw rate;

final target braking force calculating means for calculating a final target braking force for the front wheel based on the first target braking force for the front wheel and the second target braking force for the front wheel and for calculating a final target braking force for the rear wheel based on the first target braking force for the rear wheel and second target braking force for the rear wheel;

braking wheel determining means for determining a braking wheel based on the actual yaw rate and the yaw rate deviation such that the rear wheel on the side of a turning center is selected when the actual yaw rate differs from the yaw rate deviation in sign and such that said front wheel on the opposite side of a turning center is selected when the actual yaw rate agrees with the yaw rate deviation in sign;

output judging means for determining a judging threshold value of the yaw rate deviation and for judging whether or not the yaw rate deviation is in a control zone by comparing the yaw rate with the judging threshold value; and brake signal outputting means for outputting a brake signal to the brake drive apparatus so as to apply the final target braking force to the braking wheel.

BRIEF DESCRIPTION OF THE DRAWINGS

Preferred embodiments of the present invention will be hereinafter be described by reference to the accompanying drawings, in which:

FIGS. 6A–6F are time charts of a braking force control according to the present invention;

DETAILED DESCRIPTION OF THE PREFERRED EMBODIMENTS

Figure 2:
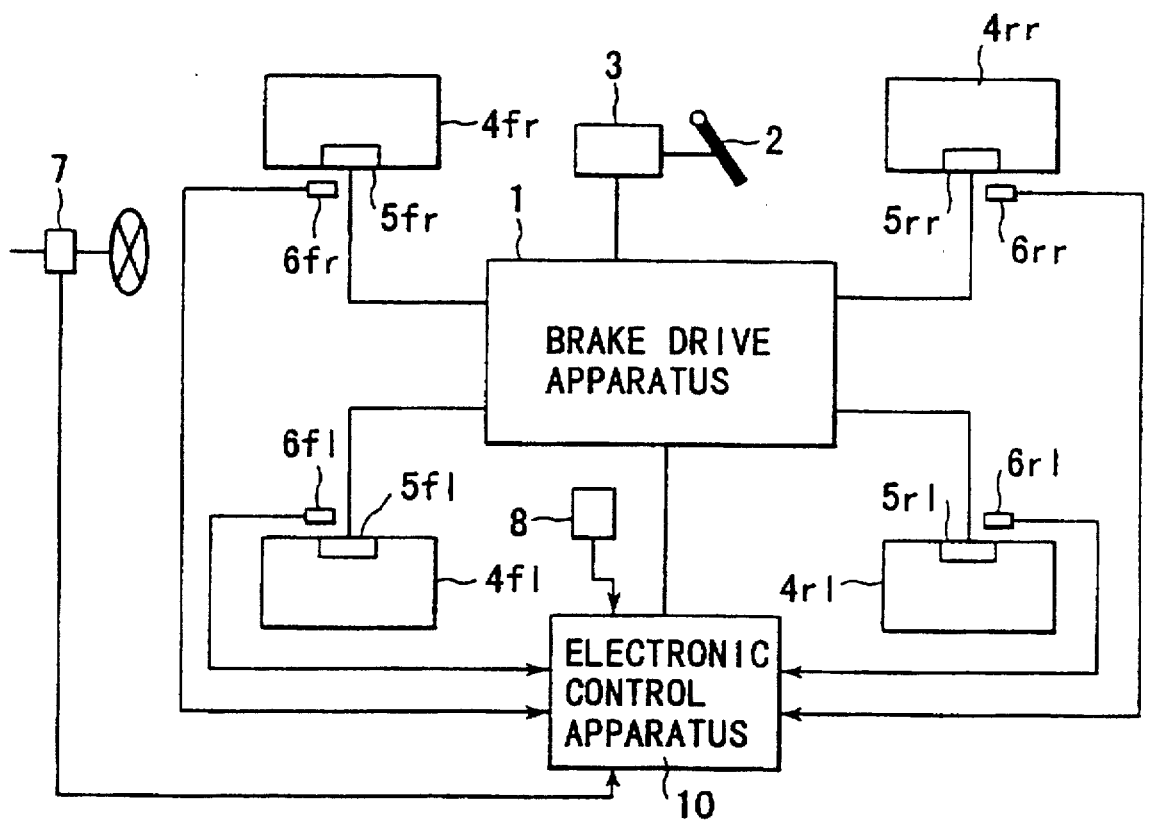
FIG. 2 is a schematic diagram showing a construction of a braking force control system according to the present invention.

Referring now to FIG. 2, numeral 1 denotes a brake drive apparatus to which a brake pedal 2 operated by a vehicle driver and a master cylinder 3 are connected. When the vehicle driver depresses the brake pedal 2, brake pressure is supplied from the master cylinder 3 to each of wheel cylinders, $5_{fl}$ for a left front wheel, $5_{fr}$ for a right front wheel, $5_{rl}$ for a left rear wheel and $5_{rr}$ for a right rear wheel through the brake drive section 1 to apply brakes to four wheels, a left front wheel $4_{fl}$, a right front wheel $4_{fr}$, a left rear wheel $4_{rl}$ and a right rear wheel $4_{rr}$.

The brake drive apparatus 1 is a hydraulic unit comprising a pressure source, pressure reducing valves, pressure increasing valves and the like for feeding brake pressure independently to each wheel cylinder, $5_{fl}$, $5_{fr}$, $5_{rl}$ and $5_{rr}$, according to input signals.

The wheel speeds of four wheels are detected independently for each of four wheels $4_{fl}$, $4_{fr}$, $4_{rl}$, $4_{rr}$ by wheel speed sensors, $6_{fl}$ for the left front wheel, $6_{fr}$ for the right front wheel, $6_{rl}$ for the left rear wheel and $6_{rr}$ for the right rear wheel. Further, a steering wheel angle sensor 7 is disposed at the steering wheel section to detect the rotational angle of the steering wheel.

Numeral 10 denotes an electronic control apparatus composed of a micro-computer and its peripheral circuits, to which the wheel speed sensors $6_{fl}$, $6_{fr}$, $6_{rl}$ and $6_{rr}$, the steering wheel angle sensor 7 and a yaw rate sensor 8 composed of acceleration sensors for detecting an actual yaw rate and from which a drive signal is outputted to the brake drive apparatus 1. The signal from the yaw rate sensor 8 is inputted to the electronic control apparatus 10 through a low-pass filter of 7 Hz, for example.

Figure 1:
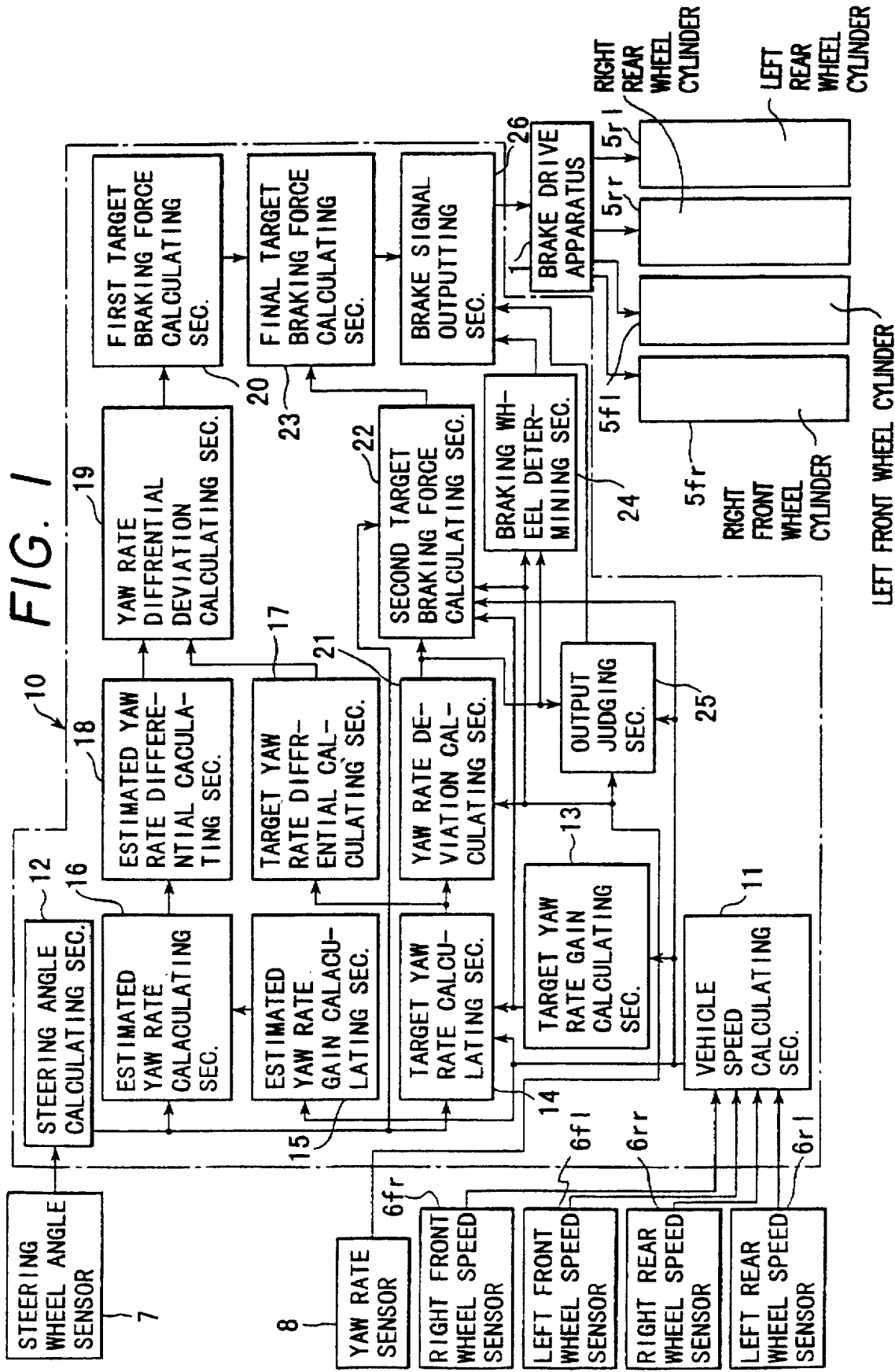
FIG. 1 is a block diagram showing an embodiment of a braking force control system for a vehicle according to the present invention.

As shown in FIG. 1, the electronic control apparatus 10 comprises a vehicle speed calculating section 11, a steering angle calculating section 12, a target yaw rate gain calculating section 13, a target yaw rate calculating section 14, an estimated yaw rate gain calculating section 15, an estimated yaw rate calculating section 16, a target yaw rate differential calculating section 17, an estimated yaw rate differential calculating section 18, a yaw rate differential deviation calculating section 19, a first target braking force calculating section 20, a yaw rate deviation calculating section 21, a second target braking force calculating section 22, a final target braking force calculating section 23, a braking wheel determining section 24, an output judging section 25 and a brake signal outputting section 26.

The vehicle speed calculating section 11 obtains a vehicle speed V by calculating based on wheel speeds $\omega_1$, $\omega_2$, $\omega_3$, $\omega_4$ derived from the wheel speed sensors 6fl, 6fr, 6rl, 6rr respectively according to a predetermined formula (for example averaging speed signals from the wheel speed sensors $6_{fl}$, $6_{fr}$, $6_{rl}$ and $6_{rr}$) and outputs the calculated vehicle speed V to the target yaw rate gain calculating section 13, the estimated yaw rate gain calculating section 15 and the second target braking force calculating section 22.

Further, the steering angle calculating section 12 calculates an actual steering angle δf (=θ/N) by dividing a steering angle θ derived from the steering angle sensor 7 by a steering gear ratio N and outputs the actual steering angle δf to the target yaw rate calculating section 14, the estimated yaw rate calculating section 16 and the second target braking force calculating section 22.

Further, the target yaw rate gain calculating section 13 calculates a yaw rate value (a target yaw rate gain $G_{\gamma\delta f}(0)$) with respect to the actual steering angle δf when the vehicle turns around a fixed circle and outputs the calculated target yaw rate gain $G_{\gamma\delta f}(0)$ to the target yaw rate calculating section 14 and the second target braking force calculating section 22. The target yaw rate gain Gγδf is calculated according to the following formula:

$$G_{\tau\delta f}(0)=[1/(1+A_0 \cdot V^2)] \cdot V/L \quad (1)$$

where L is a wheelbase of the vehicle; $A_0$ is a stability factor determined by vehicle specifications. Further, the stability factor $A_0$ is obtained according to the following formula:

$$A_0=\{-m \cdot (L_f \cdot CP_f - L_r \cdot CP_r)\}/(2 \cdot L^2 \cdot CP_f \cdot CP_r) \quad (2)$$

where m is a vehicle weight; $L_f$ is a distance between a front axle and a center of gravity; $L_r$ is a distance between a rear axle and a center of gravity; $CP_f$ is a front cornering power; $CP_r$ is a rear cornering power.

The target yaw rate calculating section 14 calculates a target yaw rate $\tau'$ taking a delay of response into consideration based on the actual steering angle $\delta f$ derived from the steering angle calculating section 12 and the target yaw rate gain $G_{\tau\delta f}(0)$ derived from the target yaw rate gain calculating section 13 and outputs the calculated target yaw rate $\tau'$ to the target yaw rate differential calculating section 17 and the yaw rate deviation calculating section 21. The target yaw rate $\tau'$ is calculated according to the following formula:

$$\tau'=[1/(1+T \cdot s)] \cdot G_{\tau\delta f}(0) \cdot \delta f \quad (3)$$

where T is a time constant; s is a Laplacean. The formula (3) is a formula in which the response delay of the vehicle in the second order is approximated to the one in the first order. The time constant T is obtained from the following formula:

$$T=m \cdot L_f \cdot V/(2 \cdot L \cdot CP_r) \quad (4)$$

The estimated yaw rate gain calculating section 15 calculates a yaw rate value (estimated yaw rate gain $G_{\tau\delta f}(0)_{Low}$) with respect to an actual steering angle of when the vehicle turns around a fixed circle on a road with a surface having low friction coefficient and outputs the calculated estimated yaw rate gain $G_{\tau\delta f}(0)_{Low}$ to the estimated yaw rate gain calculating section 16. The estimated yaw rate gain $G_{\tau\delta f}(0)_{Low}$ is calculated according to the following formula:

$$G_{\tau\delta f}(0)_{Low}=1/(1+A_{0Low} \cdot V^2) \cdot V/L \quad (5)$$

where $A_{0Low}$ is a stability factor determined by the vehicle specifications when the vehicle runs on a road with a surface having low friction coefficient. The stability factor $A_{0Low}$ when the vehicle runs on a road with a surface having low friction coefficient is obtained according to the following formula:

$$A_{0Low}=\{-m \cdot (L_f \cdot CP_{fLow} - L_r \cdot CP_{rLow})\}/(2 \cdot L^2 \cdot CP_{fLow} \cdot CP_{rLow}) \quad (6)$$

Further, the estimated yaw rate calculating section 16 calculates an estimated yaw rate $\tau'_{Low}$ on a road with a surface having low friction coefficient taking a delay of response of the vehicle based on the actual steering angle $\delta f$ derived from the steering angle calculating section 12 and on the estimated yaw rate gain $G_{\tau\delta f}(0)_{Low}$ and outputs the estimated yaw rate $\tau'_{Low}$ on a road with a surface having low friction coefficient to the estimated yaw rate differential calculating section 18. The estimated yaw rate $\tau'_{Low}$ is calculated according to the following formula:

$$\tau'_{Low}=1/(1+T_{Low} \cdot s) \cdot G_{\tau\delta f}(0)_{Low} \cdot \delta f \quad (7)$$

where $T_{Low}$ is a time constant. The above formula (7) is a formula in which a delay of response expressed in the second order is approximated to the first order. The time constant $T_{Low}$ is obtained from the following formula for example:

$$T_{Low}=m \cdot L_f \cdot V/2 \cdot L \cdot CP_{rLow} \quad (8)$$

The target yaw rate differential calculating section 17 calculates a differential value $S\tau'$ (target yaw rate differential value) of the target yaw rate $\tau'$ calculated in the target yaw rate calculating section 14 and the estimated yaw rate differential calculating section 18 calculates a differential value $S\tau'_{Low}$ (estimated yaw rate differential value) of the estimated yaw rate $\tau'_{Low}$ calculated in the estimated yaw rate calculating section 16.

The target yaw rate differential value $S\tau'$ calculated in the target yaw rate differential calculating section 17 and the estimated yaw rate differential value $S\tau'_{Low}$ calculated in the estimated yaw rate differential calculating section 18, are inputted to the yaw rate differential deviation calculating section 19 wherein a deviation $d\Delta\tau$ of the estimated yaw rate differential value $S\tau'_{Low}$ from the target yaw rate differential value $S\tau'$ is calculated as follows:

$$d\Delta\tau=S\tau'_{Low}-S\tau' \quad (9)$$

Further, the first target braking force calculating section 20 to which the yaw rate differential deviation $d\Delta\tau$ is inputted from the yaw rate differential deviation calculating section 19 calculates a target braking force of the front and rear wheels respectively (first front wheel target brake pressure $BF1_f$ and first rear wheel target brake pressure $BF1_r$) and outputs the first front wheel target brake pressure $BF1_f$ and the first rear wheel target brake pressure $BF1_r$ to the final target braking force calculating section 23. The first target brake pressure $BF1_f$ and $BF1_r$ are calculated according to the following formula.

$$BF1_f=G_1 \cdot d\Delta\tau \cdot I_z/(d_f/2) \quad (10)$$

$$BF1_r=G_1 \cdot G_2 \cdot d\Delta\tau \cdot I_z/(d_r/2) \quad (11)$$

where $G_1$ is a gain (for example it takes 0.05) and $G_2$ is also a gain (for example it takes 0.15); $I_z$ is a yaw inertia moment of the vehicle; $d_f$ is a front tread; $d_r$ is a rear tread, with tread being defined as the transverse distance between the left and right side wheels on the same axle, measure between specified points, such as the centers of tire contact. In the formula (10), $G_1$ is a first large gain and $d\Delta\tau \cdot I_z/(d_f/2)$ indicates a first theoretical braking force for the front wheel. Further, in the formula (11), $G_1 \cdot G_2$ is a first mall gain and $d\Delta\tau I_z/(d_r/2)$ indicates a first theoretical braking force for the rear wheel. The reason why the gain of the rear wheel is small is to prevent a side slip at the rear wheel on a road with a surface having low friction coefficient and another reason is to save uneasiness from a vehicle operator when the vehicle head turns excessively.

Thus, the first target brake pressure $BF1_f$ and $BF1_r$ are values obtained on the assumption that the vehicle runs on a road with surface having low friction coefficient. The reason why the vehicle is assumed to run on a road having low friction coefficient is that the braking force control is most required when the vehicle runs on a road with a surface having low friction coefficient. The gains used in the above formulas are predetermined based on experimental data or known theoretical calculations.

The yaw rate deviation calculating section 21 obtains a yaw rate deviation $\Delta\tau$ by subtracting the target yaw rate $\tau'$ calculated in the target yaw rate calculating section 14 from the actual yaw rate $\tau$ detected by the yaw rate sensor 8 ($\Delta\tau=\tau-\tau'$), and outputs this yaw rate deviation $\Delta\tau$ to the second target braking force calculating section 22, the braking wheel discriminating section 24 and the output judging section 25.

The second target braking force calculating section 22 calculates a target braking force of the front and rear wheels respectively (second front wheel target brake pressure $BF2_f$ and second rear wheel target brake pressure $BF2_r$) based on the vehicle running condition and the yaw rate deviation and outputs the calculated second target brake pressures, $BF2_f$, $BF2_r$ to the final target braking force calculating section 23. The second target brake pressures $BF2_f$ and $BF2_r$ are calculated in accordance with the following formulas.

$$BF2_f = G_3 \cdot (\Delta A \cdot 4 \cdot L^{2 \cdot CP_r} \cdot CP_r \cdot V) / [(CP_f + CP_r) \cdot d_f] \cdot \tau \quad (12)$$

$$BF2_r = G_3 \cdot G_4 (\Delta A \cdot 4 \cdot L^2 \cdot CP_f CP_r \cdot V) / [(CP_f + CP_r) \cdot d_r] \cdot \tau \quad (13)$$

where $G_3$ is a gain (for example it takes 8.0) and $G_4$ is also a gain (for example it takes 0.15). Further, $\Delta A$ is calculated according to the following formula:

$$\Delta A = [\delta f/(G_{x\beta}(0) \cdot \delta f + \Delta \tau) - 1/G_{x\beta}(0)]/L \cdot V \quad (14)$$

The yaw rate deviation $\Delta \tau$ in the formula (14) may be corrected by a side slip angle $\beta$ (angle contained by a running direction of the vehicle and a lengthwise direction of the vehicle).

The above gains $G_3$ and $G_4$ are established for the same reason as $G_1$ and $G_2$. In the formula (12), $G_3$ is a second large gain and other part of the formula shows a second front wheel theoretical braking force. Further, in the formula (13), $G_3 \cdot G_4$ is a second small gain and other part of the formula indicates a second rear wheel theoretical braking force. Due to this small gain, the braking force applied to the rear wheel is restricted to relatively small. That is to say, the braking force applied to the rear wheel is adjusted by the fine establishment of the gains $G_1$, $G_2$, $G_3$ and $G_4$, thereby a reasonable behavior and a good running stability of the vehicle can be obtained.

The final target braking force calculating section 23 calculates final target braking forces (final target brake pressures) $BF_f$ and $BF_r$ by adding the first target brake pressures $BF1_f$ and $BF1_r$ to the second target brake pressures $BF2_f$ and $BF2_r$ according to the following formulas:

$$BF_f = BF1_f + BF2_f \quad (15)$$

$$BF_r = BF1_r + BF2_r \quad (16)$$

According to the embodiment of the present invention, since the control condition of the system is corrected by an assumed running condition on a road with a surface having low friction coefficient, the delay time of the control can be minimized, thereby the responseability and the follow-up characteristic of the system can substantially be improved. Further, since the target brake pressure is obtained from the predetermined data of the model vehicle without using an actual yaw rate signal, it is possible to determine the brake pressure with high precision.

The braking wheel determining section 24 selects a braking wheel (a wheel to which a brake is applied) according to the combination of the sign of the actual yaw rate $\tau$ and the sign of the yaw rate deviation $\Delta \tau$.

Figure 3:
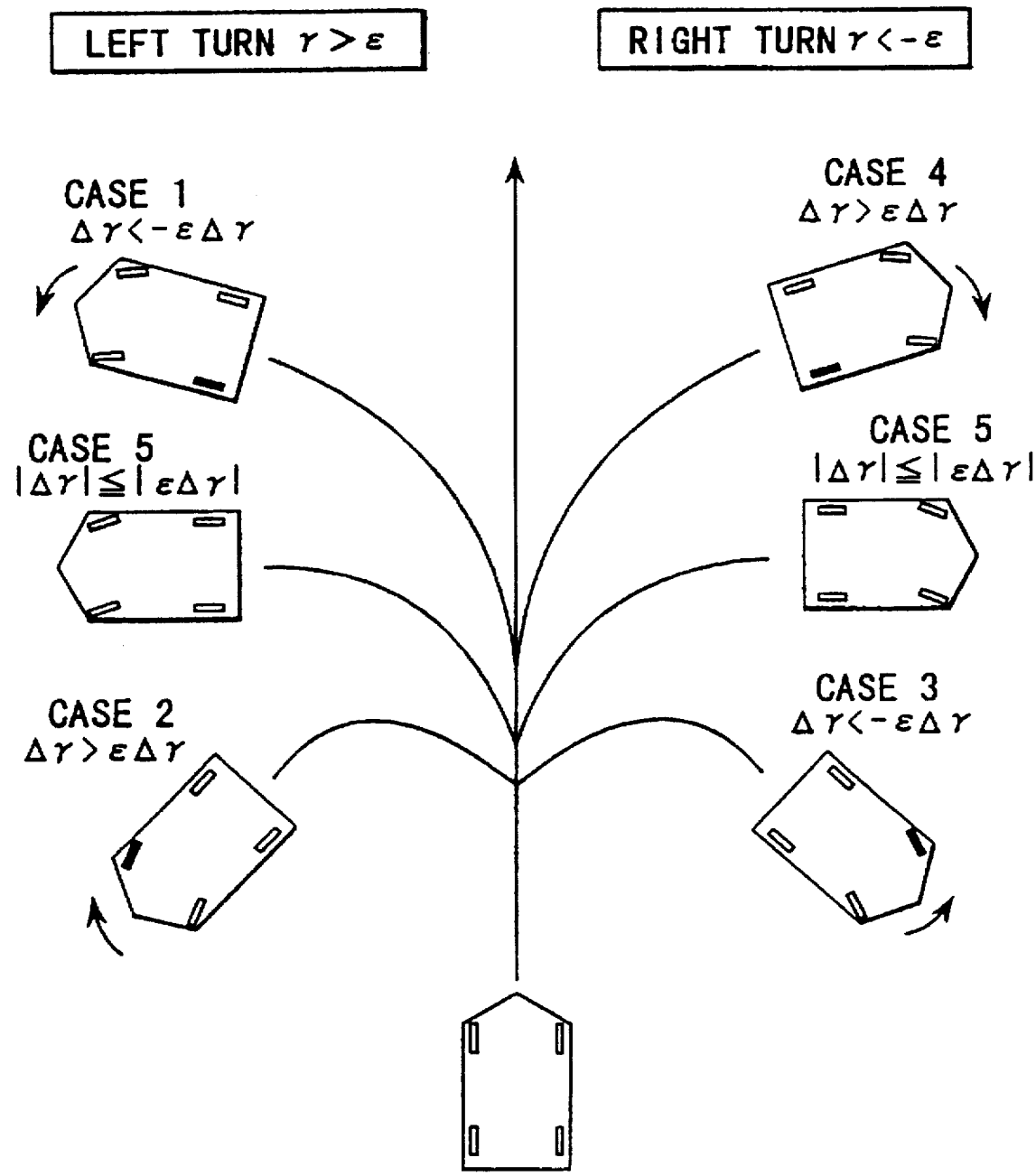
FIG. 3 is an explanatory view showing examples of behavior of a vehicle equipped with a braking force control system according to the present invention.

As to whether the actual and target yaw rates, $\tau$, $\tau'$ are plus or minus, a plus sign is given when the vehicle turns to the left and a minus sign is given when the vehicle turns to the right. As shown in FIG. 3, the braking wheel is selected as follows:

Case 1. A brake is applied to the left rear wheel, when $\tau > \epsilon$ and $\Delta \tau < -\epsilon \Delta \tau$, i.e., the vehicle is turning to the left and is in an under-steer tendency with respect to the target yaw rate $\tau'$;

Case 2. A brake is applied to the right front wheel, when $\tau > \epsilon$ and $\Delta \tau > \epsilon \Delta \tau$, i.e., the vehicle is turning to the left and is in an over-steer tendency with respect to the target yaw rate $\tau'$;

Case 3. A brake is applied to the left front wheel, when $\tau < \epsilon$ and $\Delta \tau < -\epsilon \Delta \tau$, i.e., the vehicle is turning to the right and is in an over-steer tendency with respect to the target yaw rate $\tau'$;

Case 4. A brake is applied to the right rear wheel, when $\tau < \epsilon$ and $\Delta \tau > \epsilon \Delta \tau$, i.e., the vehicle is turning to the right and is in an under-steer tendency with respect to the target yaw rate $\tau'$; and Case 5. No brake is applied to any wheel, when $|\tau| < |\epsilon|$, i.e., the vehicle is almost in a straight running condition, or $|\Delta \tau| = |\epsilon \Delta \tau|$, i.e., the vehicle is in an almost neutral-steer condition; where $\epsilon$ and $\epsilon \Delta \tau$, are positive values which are nearly equal to zero and these are predetermined through experiments or calculations.

Except for Case 5 where it is judged that the vehicle travels in straight, or that the vehicle is in a neutral-steer condition, when the sign of the actual yaw rate $\tau$ is different from that of the yaw rate deviation $\Delta \tau$, the inner rear wheel is selected as a braking wheel and when the sign of the actual yaw rate $\tau$ is the same as that of the yaw rate deviation $\Delta \tau$, the outer front wheel is selected as a braking wheel. The signal of the selected wheel is outputted from the braking wheel determining section 24 to the brake signal outputting section 26.

The output judging section 25 determines a judging threshold value $\epsilon A$ which will be described hereinafter and judges whether or not the yaw rate deviation $\Delta \tau$ is in the control area by comparing the yaw rate deviation $\Delta \tau$ with the judging threshold value $\epsilon A$ and outputs the result of the judgement to the brake signal outputting section 26.

In the judging threshold value $\epsilon A$, a first threshold value $\epsilon AM$ is set when the vehicle is in a normal behavior. Until a specified time elapses since the behavior tendency of the vehicle is shifted from under-steer to over-steer, or until either the yaw rate deviation or the actual yaw rate becomes zero after the vehicle is shifted to an over-steer tendency, a second threshold value $\epsilon AS$ is set as the judging threshold value $\epsilon A$. These first threshold value $\epsilon AM$ and second threshold value $\epsilon AS$ are both positive numbers which have been obtained from experiments, calculations or the like beforehand. Further, the relationship between these threshold values is $|\epsilon AM| > |\epsilon AS| \geq |\epsilon \Delta \tau|$.

Figure 7A:
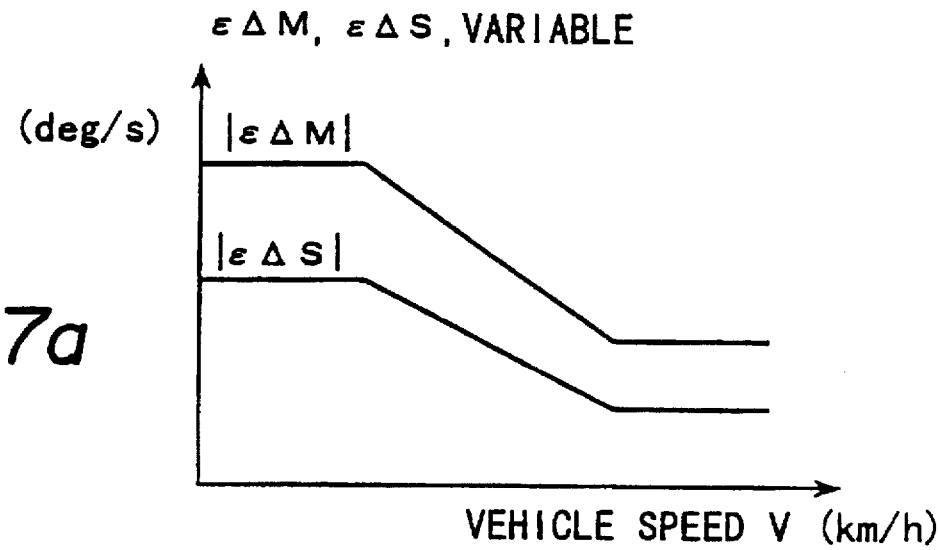
FIG. 7a is a schematic diagram showing an example of first and second threshold values varying according to the vehicle speed.
Figure 7B:
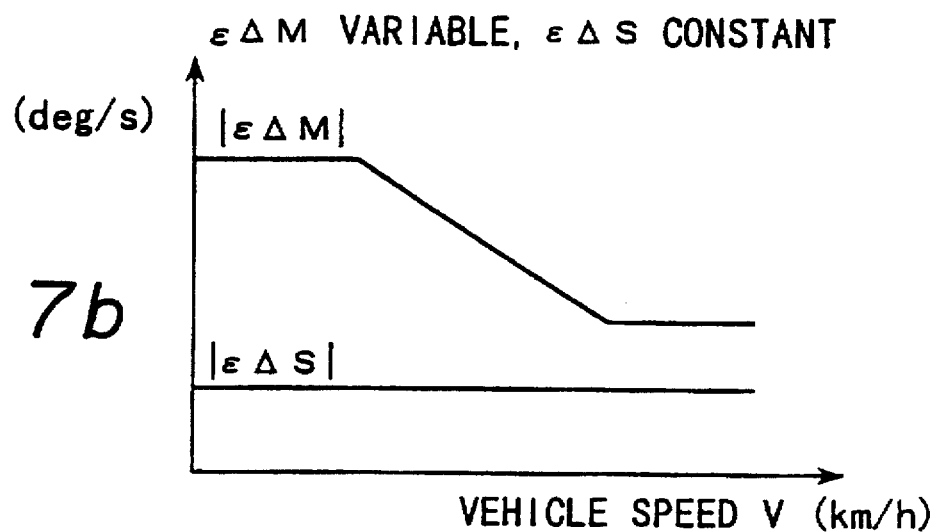
FIG. 7b is a schematic diagram showing an example of a first threshold value varying according to the vehicle speed and a second threshold value being constant with respect to the vehicle speed.
Figure 7C:
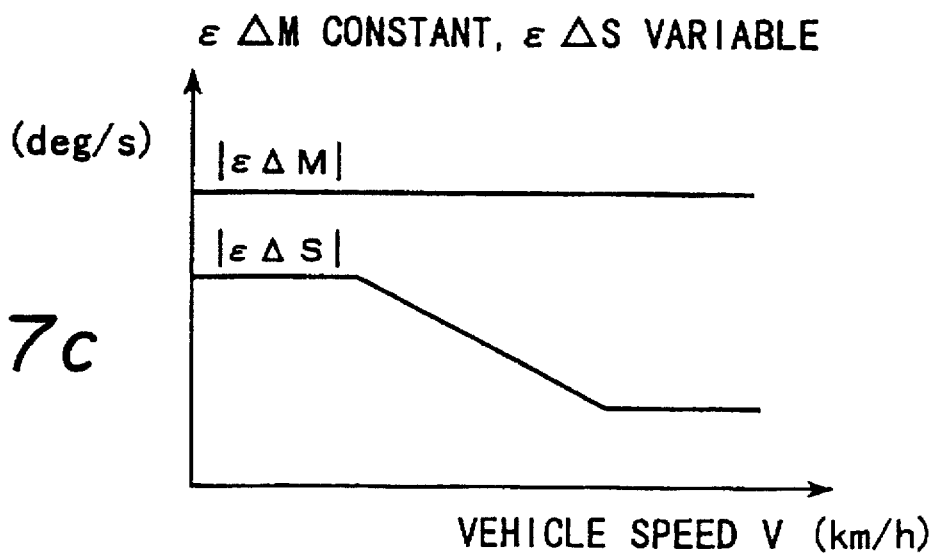
FIG. 7c is a schematic diagram showing an example of a first threshold value being kept constant with respect to the vehicle speed and a second threshold value varying according to the vehicle speed.

The first threshold value $\epsilon AM$ and the second threshold value $\epsilon AS$ are stored on maps as shown in FIG. 7a to FIG. 7c. When the vehicle behavior becomes unstable at low speed, a vehicle driver can more easily correct the vehicle posture than at high speed and hence a noncontrol zone, i.e., a zone where the control is not needed, can be established with a broader range, In an example of the threshold values shown in FIG. 7a, both the first and second threshold values, $\epsilon AM$ and $\epsilon AS$ are established in such a way that these values are decreased with an increase of vehicle speed. In-an example shown in FIG. 7b, only the first threshold value $\epsilon AM$ becomes small with an increase of vehicle speed while the second threshold value $\epsilon AS$ is held constant. Further, in an example shown in FIG. 7c, while the first threshold value $\epsilon AM$ is held constant, the second threshold value $\epsilon AS$ becomes small with an norease of vehicle speed.

When the output judging section 25 outputs a judging signal indicating that the yaw rate deviation is in the control zone, the brake signal outputting section 26 sends an output signal to the brake drive apparatus 1 such that the final target brake pressures $BF_f$ or $BF_r$ which have been calculated in the final target brake pressure calculating section 23 is applied to the wheel selected in the braking wheel determining section 24.

Figure 4:
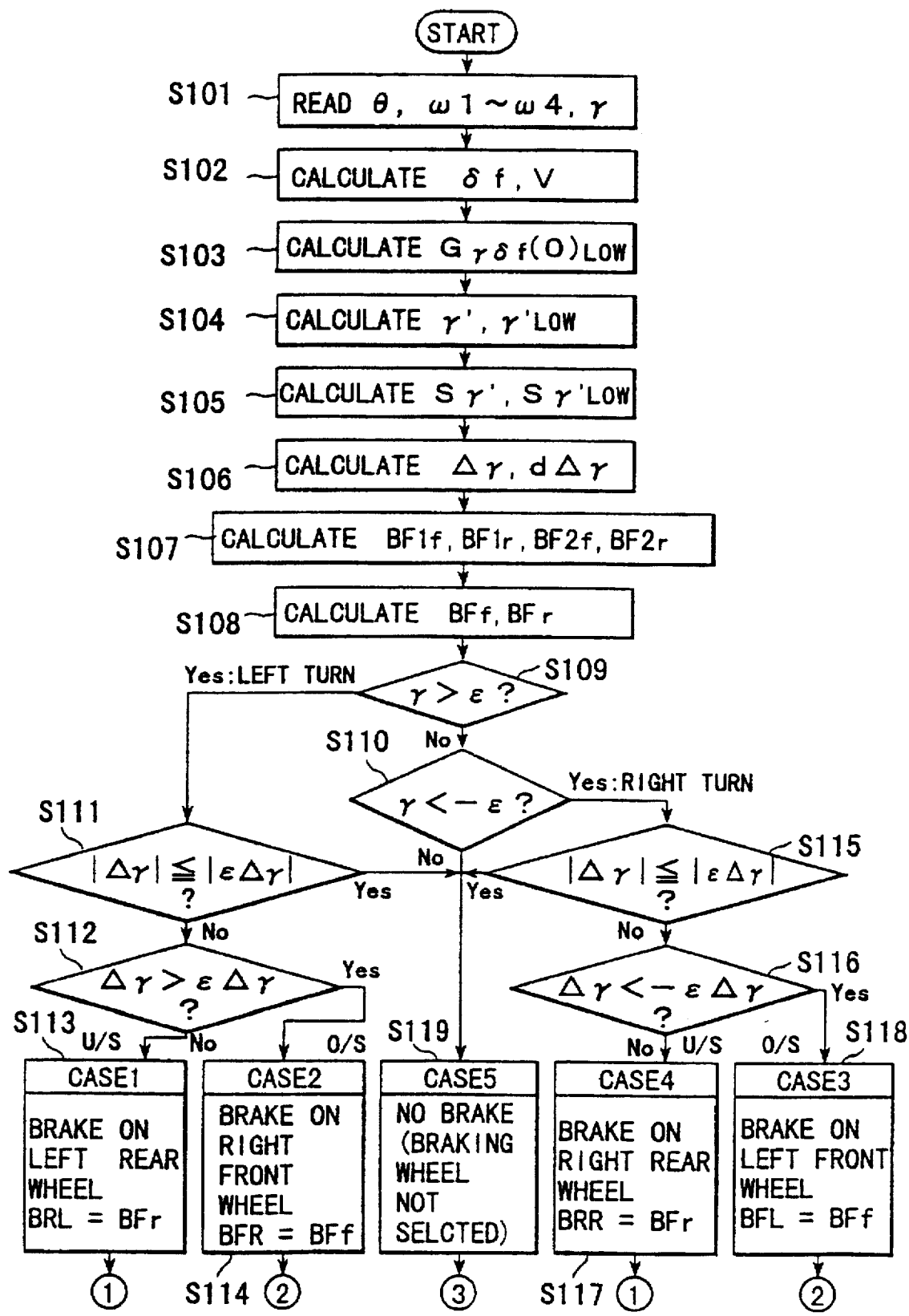
FIG. 4 is a flowchart of a braking force control system according to the present invention.
Figure 5:
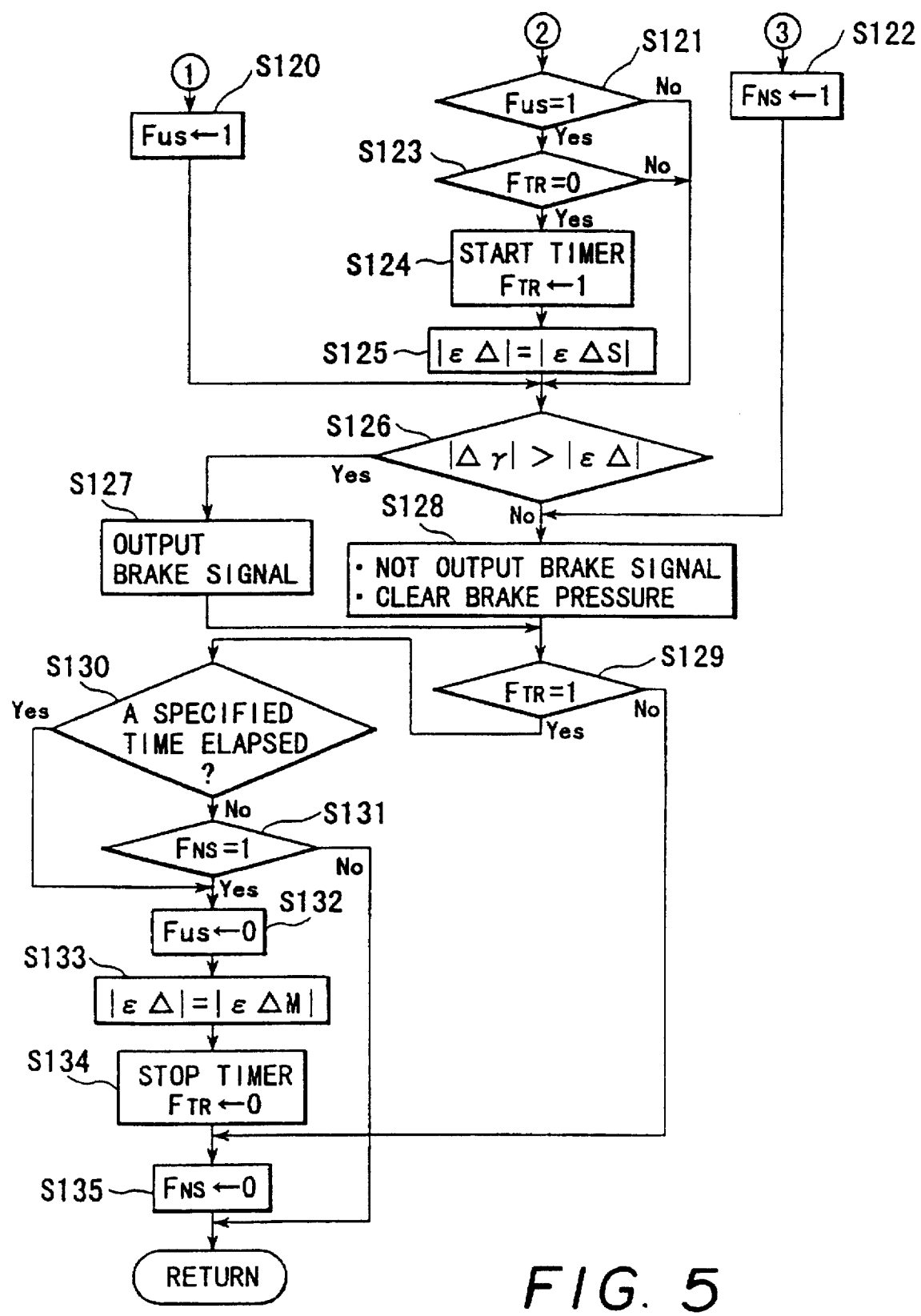
FIG. 5 is a flowchart continued from FIG. 4.

Next, an operation of the braking force control according to the embodiment of the present invention will be described with reference to flowcharts shown in FIG. 4 and FIG. 5. The control program for the braking force control system is executed at a specified time interval (for example 10 millisecond) during running of the vehicle. When the program starts, at a step S101 a steering wheel angle θ is read from the steering wheel angle sensor 7, wheel speeds $\omega_1$, $\omega_2$, $\omega_3$, $\omega_4$ are read from the wheel speed sensors $6_{fl}$, $6_{fr}$, $6_{rl}$, $6_{rr}$ respectively, an actual yaw rate τ is read from the yaw rate sensor 8 and the program goes to S102.

At S102 an actual steering angle $\delta_f$ is calculated from the steering wheel angle θ($\delta_f$=θ/N) in the steering angle calculating section 12 and a vehicle speed V is calculated from the wheel speeds $\omega_1$, $\omega_2$, $\omega_3$, $\omega_4$ in the vehicle speed detecting section 11.

The program goes to S103 where a target yaw rate gain $G_{\tau\delta f}(0)$ is calculated according to the formula (1) in the target yaw rate gain calculating section 13 and an estimated yaw rate gain $G_{\tau\delta f}(0)_{Low}$ is calculated according to the formula (5) in the estimated yaw rate gain calculating section 15.

Further, the program goes to S104 where a target yaw rate τ' is calculated according to the formula (3) the target yaw rate calculating section 14 and an estimated yaw rate $\tau'_{Low}$ on a road with a surface having low friction coefficient is calculated according to the formula (7) in the estimated yaw rate calculating section 16.

Next, the program goes to S105 where a target yaw rate differential Sτ' which is a differential value of the target yaw rate τ' calculated in the target yaw rate calculating section 14 is calculated in the target yaw rate differential calculating section 17 and an estimated yaw rate differential $S\tau'_{Low}$ which is a differential value of the estimated yaw rate $\tau'_{Low}$ calculated in the estimated yaw rate calculating section 16 is calculated in the estimated yaw rate differential calculating section 18.

Next, the program steps to S106 where a deviation dΔτ between target yaw rate differential Sτ' and the estimated yaw rate differential $S\tau'_{Low}$ is calculated according to the formula (9) in the yaw rate differential deviation calculating section 19 and a yaw rate deviation Δτ(=τ−τ') is calculated in the yaw rate deviation calculating section 21.

Then, the program goes to S107 where first target brake pressures $BF1_f$, $BF1_r$ are calculated according to the formulas (10) and (11) in the first target braking force calculating section 20 and second target brake pressures $BF2_f$, $BF2_r$ are calculated according to the formulas (12) and (13) in the second target braking force calculating section 22.

After that, the program steps to S108 where final target brake pressures $BF_f$, $BF_r$ are calculated according to the formulas (15) and (16) in the final target braking force calculating section 23.

The steps S109 to S119 are steps performed in the braking wheel determining section 24. First, at S109 it is judged whether or not the actual yaw rate τ is larger than ε, that is to say, whether or not the vehicle is making a relatively sharp left turn and if the actual yaw rate τ is less than ε the program goes to S110 where it is judged whether or not the actual yaw rate τ is smaller than −ε., that is to say, whether or not the vehicle is making a relatively sharp right turn. If at S110 it is judged to be ε≧τ≧−ε, since it can be judged that the vehicle is making neither a left turn nor a right turn, namely since it can be judged that the vehicle is running roughly in straight, no braking wheel is selected (no brake is applied to any wheel). If at S109 it is judged that τ is larger than ε (τ>ε), the program goes to S111 where it is judged whether or not the yaw rate deviation Δτ near zero according to the formula of inequality |Δτ|≦|εΔτ|, namely, it is judged whether or not the vehicle s roughly in a neutral-steer.

Further, at S111 if |Δτ|≦|εΔτ|, the program steps to S119 and if otherwise (in an under-steer tendency or in an over-steer-tendency), the program goes to S112. The step S112 (is a step where it is judged whether or not the vehicle is either in an under-steer tendency or in an over-steer tendency, At S112 if Δτ<−εΔτ, since the sign of the yaw rate deviation Δτ is negative differently from the sign of the actual yaw rate τ, it is judged that the vehicle is in an under-steer tendency with respect to the target yaw rate τ' and the program steps to S113 where a left rear wheel $4_{rl}$ is selected as a braking wheel.

Further, at S112 if Δτ>εΔτ and the sign of the yaw rate deviation Δτ is positive similarly to the sign of the actual yaw rate τ, it is judged that the vehicle is in an over-steer tendency with respect to the target yaw rate τ' and the program steps to S114 where a right front wheel $4_{fr}$ is selected as a braking wheel.

On the other hand, at S110 if it is judged that the yaw rate τ is less than −ε(τ<−ε), that is, if it is judged that the vehicle is making a relatively sharp right turn, the program steps to S115 where it is judged whether or not the yaw rate deviation Δτ is near zero according to the formula of inequality |Δτ|≦|εΔτ|, namely, it is judged whether or not the vehicle is roughly in a neutral-steer.

At S115, if |Δτ|≦|εΔτ|and it is judged that the vehicle is roughly in a neutral-steer, the program goes to S119 and if otherwise (either in an under-steer tendency or in an over-steer tendency), the program goes to S116.

The step S116 is a step where it is judged whether the vehicle is in an under steer tendency or in an over-steer tendency according to Δτ>εΔτ or Δτ<−εΔτ. If Δτ>εΔτ and the sign of the yaw rate deviation Δτ is positive differently from the sign of the actual yaw rate τ, it is judged that the vehicle is in an under-steer tendency with respect to the target yaw rate τ' and then the program goes to S117. On the other hand, if Δτ<−εΔτ and the sign of the yaw rate deviation Δτ is negative similarly to the sign of the actual yaw rate τ, it is judged that the vehicle is in an over-steer tendency with respect to the target yaw rate τ' and then the program goes to S118.

When the program goes to S117, a right rear wheel $4_{rr}$ is selected as a braking wheel. Further, when the program goes to S118, a left front wheel $4_{fl}$ is selected as a braking wheel.

Further, when the program goes from S110, S111 or S115 to S119, no braking wheel is selected and consequently no brake is applied.

In case where a braking wheel is selected with an under-steer tendency at S113 or S117, the program goes to S120 and in case where a braking wheel is selected with an over-steer tendency at S114 or S118, the program goes to S121. Further, in case where no braking wheel is selected at S119, the program goes to S122.

When the program goes to S120, an under-steer flag $F_{US}$=is set to 1 ($F_{US}$ 1) and then the program goes to S126, The under-steer flag $F_{US}$ is a flag for indicating that the vehicle has been driven in an under-steer tendency. This flag is cleared ($F_{US}$ 0), when the threshold value determining timer is counted out, or the vehicle is shifted from the under-steer tendency to the neutral-steer tendency.

When the program goes to S121, it is judged whether or not the under-steer flag $F_{US}$ has been set to 1 ($F_{US}$=1). If it is judged that the flag has been set to 1, namely, the vehicle has been driven in an under-steer tendency, the program goes to S123 and if it is judged that the under-steer flag $F_{US}$ has been cleared, the program skips to S126. Generally, since the vehicle has experienced an under-steer tendency before moving to an over-steer tendency, when the vehicle is shifted from the under-steer tendency to the over-steer tendency, the under-steer flag $F_{US}$ has been set to 1 and therefore the program steps from S121 to S123. However, in the case where the under-steer flag $F_{US}$ has been cleared by the threshold value determining timer, or in case where the vehicle is shifted to an over-steer tendency without experiencing an under-steer tendency for some reason or other, the program skips to S126 without executing steps S123 through S125.

When the program goes to S123 after judging $F_{US}$=1 at S121, it is judged whether or not a timer start flag $F_{TR}$ has been cleared ($F_{TR}$=0). This timer start flag $F_{TR}$ is a flag which is set ($F_{TR}$=1) when the threshold value determining timer starts and is cleared ($F_{TR}$=0) when it stops.

If it is judged that the timer start flag $F_{TR}$ has been cleared ($F_{TR}$=0) and the threshold value determining timer is stopped, the program steps to S124 where the threshold value determining timer is started and at the same time the timer start flag $F_{TR}$ is set ($F_{TR}$=1) and then gees to S125. At S125 a second threshold value $\epsilon\Delta S$ is set as a judging threshold value $\epsilon\Delta$.

Further, in case where it is judged that the timer start flag $F_{TR}$ has been set ($F_{TR}$=1) at S123 and the threshold value timer is being operated, the program skips to S126.

When the program steps to S126 from either of steps S120, S121, S123 or S125, the absolute value of the yaw rate deviation $\Delta\tau$ is compared with the absolute value of the judging threshold value $\epsilon\Delta$. If $|\Delta\tau|>|\epsilon\Delta|$, namely, if it is judged that the yaw rate deviation $\Delta\tau$ is in the control area, the program goes to S127 where a brake signal is outputted from the brake signal outputting section 26 to the brake drive apparatus 1. More specifically, in case where the program has come from S113 through S120, the brake drive apparatus 1 generates a braking force corresponding to the brake pressure BRL=$BF_r$ toward the wheel cylinder $5_{rl}$ for the wheel $4_{rl}$, in case where the program has come from S117 through S120, the brake drive section 1 generates a braking force corresponding to the brake pressure BRL=$BF_r$ toward the wheel cylinder $5_{rr}$ for the wheel $4_{rr}$, in case where the program has come from S114 through S121, the brake drive section 1 generates a braking force corresponding to the brake pressure BRL=$BF_f$ toward the wheel cylinder $5_{fr}$ for the wheel $4_{fr}$, and in case where the program has come from S118 through S121, the brake drive section 1 generates a braking force corresponding to the brake pressure BRL=$BF_f$ toward the wheel cylinder $5_{fl}$ for the wheel $4_{fl}$.

On the other hand, if it is judged at S126 that the yaw rate deviation $\Delta\tau$ is in the noncontrol zone ($|\Delta\tau|\leq|\epsilon\Delta|$), the program steps to S128.

Further, in case where the program steps to S122 through S119, the program steps to S128 after a normal operation flag $F_{NS}$ is set ($F_{NS}$=1) at S119. The normal operation flag $F_{NS}$ is a flag for showing that the vehicle runs almost in a straight running condition or almost in a neutral-steer condition.

When the program steps to S128 from S122 or S126, no braking signal is outputted and further the established brake pressure is cleared. These steps S127 or S128 are processes performed in the brake signal outputting section 26.

At the next step S129, it is judged whether or not the timer start flag $F_{TR}$ is set (whether or not the threshold value determining timer is operative). If the timer start flag $F_{TR}$ has been cleared, namely, the threshold value determining timer is not operative, the program skips to S135 where the normal operation flag $F_{NS}$ is cleared and then the program goes out of the routine. If the timer start flag $F_{TR}$ has been set, namely, the threshold value determining timer is operative, the program steps to S130 where it is judged whether or not a specified time has elapsed.

If it is judged at S130 that a specified time has elapsed, the program skips to S132 where the under-steer flag $F_{US}$ is cleared. Then, at S133 a first threshold value $\epsilon\Delta M$ is set as a judging threshold value $\epsilon\Delta$ and at a next step S134 the threshold value determining timer is stopped to clear the timer start flag $F_{TR}$. After that, the program steps to S135 where the normal operation flag $F_{NS}$ is cleared and then goes out of the routine.

Further, if it is judged at S130 that a specified time has not elapsed, the program steps to S131 in which it is judged whether or not the normal operation flag $F_{NS}$ is set ($F_{NS}$=1). If the normal operation flag $F_{NS}$ is cleared ($F_{NS}$=0), the program goes out of the routine and if $F_{NS}$ is set, the program steps to S132 where the under-steer flag $F_{US}$ is cleared. Then, at S133 a first threshold value $\epsilon\Delta M$ is set as a judging threshold value $\epsilon\Delta$ and after that at S134 the threshold value determining timer is stopped to clear the timer start flag $F_{TR}$. Then, the program goes out of the routine after the normal operation flag $F_{NS}$ is cleared at S135.

That is to say, when the vehicle returns to the normal straight running condition, even before the threshold value determining timer is counted out, the first threshold value $\epsilon\Delta M$ is set as a judging threshold value $\epsilon\Delta$.

FIGS. 6A–6F depict an example of the aforementioned braking force control, in which with respect to a vehicle running in straight at $t_0$ and making a left turn at $t_1$, a change of the target yaw rate $\tau'$, a change of the actual yaw rate $\tau$, a change of the yaw rate deviation $\Delta\tau$, a mode of the normal operation flag $F_{NS}$, a mode of the timer start flag $F_{TR}$, a mode of the under-steer flag $F_{US}$ and an output of the brake signal from the brake signal outputting section 26 are shown respectively.

The actual yaw rate $\tau$ increases after $t_1$ with a gradually increasing target yaw rate $\tau'$. The yaw rate deviation $\Delta\tau$ of the target yaw rate $\tau'$ from the actual yaw rate $\tau$ also increases gradually in a negative direction.

After $t_2$, the absolute value $|\Delta\tau|$ of the yaw rate deviation $\Delta\tau$ becomes larger than the absolute value $|\epsilon\Delta\tau|$ of the threshold value $\epsilon\Delta\tau$ for judging the neutral-steer condition. At this moment, the vehicle comes into an under-steer tendency, thereby the under-steer flag $F_{US}$ is set. The normal operation flag $F_{NS}$ which has been set before $t_2$ is cleared at $t_2$ and after. Further, the first threshold value $\epsilon\Delta M$ is set as a judging threshold value $\epsilon\Delta$ for judging the noncontrol area (an area with bias lines in FIG. 6(b)) and therefore no brake signal is outputted until $t_3$ when the absolute value $|\Delta\tau|$ of the yaw rate deviation $\Delta\tau$ becomes larger than the absolute value $|\epsilon\Delta|$ of the judging threshold value $\epsilon\Delta$ for judging the noncontrol area.

Further, after $t_3$ brake signals are allowed to be outputted until $t_4$ when the absolute value $|\Delta\tau|$ of the yaw rate deviation $\Delta\tau$ becomes smaller again than the absolute value $|\epsilon\Delta|$ of the judging threshold value $\epsilon\Delta$. In this case, the output mode of brake signal is Case 1 shown in FIG., 3 because of $\tau>\epsilon$(a positive sign and a left turn) and $\Delta\tau|<-\epsilon\Delta\tau$ (a negative sign and an under-steer tendency). In Case 1, brake is applied to the left rear wheel $4_{rl}$ so as to correct the vehicle behavior by a moment produced in the arrow direction, thereby a drift-out phenomenon is prevented. In this state, even when the left rear wheel $4_{rl}$ is locked and loses a side force due to an excessive braking on the left rear wheel $4_{rl}$, the vehicle still keeps an over-steer tendency and generates a yaw rate having the same direction (an arrow direction) as the nature of the control.

Between $t_4$ and $t_5$, although the vehicle is still in an under-steer tendency, the actual yaw rate $\tau$ comes close to the target yaw rate $\tau'$ and the absolute value $|\Delta\tau|$ of the yaw rate deviation $\Delta\tau$ becomes smaller than the absolute value $|\epsilon\Delta|$ of the judging threshold value $\epsilon\Delta$. In this situation, since the vehicle is in the noncontrol zone, no brake signal is outputted. Further, between $t_5$ and $t_6$, the absolute value $|\Delta\tau|$ of the yaw rate deviation $\Delta\tau$ becomes smaller than the absolute value $|\epsilon\Delta\tau|$ of the threshold value $\epsilon\tau$ and the vehicle enters into a neutral-steer condition. The normal operation flag $F_{NS}$ is set.

After that, the absolute value $|\Delta\tau|$ of the yaw rate deviation $\Delta\tau$ becomes large in the positive direction. After t6, the vehicle is shifted to an over-steer tendency with respect to the target yaw rate $\tau'$ and the normal operation flag $F_{NS}$ is cleared. At the same time, the timer start flag $F_{TR}$ is set to start the threshold value determining timer. Further, the second threshold value $\epsilon\Delta S$ which is smaller than the first threshold value $\epsilon\Delta M$ is set as a judging threshold value $\epsilon\Delta$.

No brake signal is outputted until $t_7$, since the absolute value $|\epsilon\Delta|$ of the yaw rate deviation $\Delta\tau$ is smaller than the absolute value $|\epsilon\Delta|$ of the judging threshold value $\epsilon\Delta$. After $t_7$, brake signals are allowed to be outputted, In this case, the output mode of brake signal is Case 2 shown in FIG. 3 because of $\tau > \epsilon$ (a positive sign and a left turn) and $\Delta\tau > \epsilon\Delta\tau$ (a positive sign and an over-steer tendency), In Case 2, brake is applied to the right front wheel $4_{fr}$ so as to correct the vehicle behavior by a moment produced in the arrow direction, thereby a spin phenomenon is prevented, In this state, even when the right front wheel $4_{fr}$ is locked and loses a side force due to an excessive braking on the left rear wheel $4_{rl}$, the vehicle still keeps an under-steer tendency and generates a yaw rate having the same direction (an arrow direction) as the nature of the control, Further, at $t_8$ the absolute value $|\Delta\tau|$ of the yaw rate deviation $\Delta\tau$ becomes smaller than the absolute value $|\epsilon\Delta|$ of the judging threshold value $\epsilon\Delta$ and the vehicle enters nto the noncontrol area, After $t_9$, the vehicle enters into a neutral-steer condition before the threshold value determining timer is counted out.

At $t_9$, the normal operation flag $F_{NS}$ is set and at the same time the under-steer flag $F_{US}$ is cleared. The threshold value determining timer is stopped to clear the timer start flag $F_{TR}$. Then, the first threshold value $\epsilon\Delta M$ is set as a judging threshold value $\epsilon\Delta$.

After $t_{10}$, the absolute value $|\Delta\tau|$ of the yaw rate deviation $\Delta\tau$ becomes larger than the absolute value $\epsilon\Delta\tau|$ of the threshold value $\epsilon\Delta\tau$ and the normal operation flag $F_{NS}$ is cleared, The vehicle is again shifted to an under-steer tendency and the under-steer flag $F_{US}$ is set.

Then, after t11, the absolute value $|\Delta\tau|$ of the yaw rate deviation $\Delta\tau$ becomes smaller than the absolute value $|\epsilon\Delta\tau|$ of the threshold value $\epsilon\Delta\tau$. The vehicle enters into a neutral-steer condition and the normal operation flag $F_{NS}$ is set. At this time, the actual yaw rate $\tau$ becomes roughly equal to the target yaw rate. The under-steer flag $F_{US}$ remains to be set, however, this does not produce any problem because the vehicle generally experiences an under-steer tendency before it is shifted to an over-steer tendency.

Following $t_8$, since the absolute value $|\Delta\tau|$ of the yaw rate deviation $\Delta\tau$ becomes smaller than the absolute value $|\epsilon\Delta|$ of the judging threshold value $\epsilon\Delta$, the vehicle stays in the noncontrol zone and therefore no brake signal is outputted.

In the output judging section 25, since the second threshold value $\epsilon\Delta S$ which is smaller than the first threshold value $\epsilon\Delta$ is employed as a judging threshold value $\epsilon\Delta$ during a specified time or until the control under an over-steer tendency is finished, the starting of the control at the converting point from the under-steer tendency to the over-steer tendency can be advanced. In FIG. 6, two-dots chain lines show a yaw rate or a yaw rate deviation according to the prior art. As well understood by these yaw rate or yaw rate deviation, the starting of the control at the converting point from an under-steer tendency to an over-steer tendency is $t_7'$ when the yaw rate deviation $\Delta\tau$ becomes equal to $\epsilon\Delta M$. Hence, the difference between the actual yaw rate $\tau$ and the target yaw rate $\tau'$ becomes not so large after the vehicle is shifted from an under-steer tendency to an over-steer tendency. Further, according to the present invention, as easily understood from FIG. 6(a), the actual yaw rate $\tau$ can be converged on the target yaw rate $\tau'$ earlier than in the prior art. As a result, the vehicle driver can enjoys a smoother, more natural and more docile vehicle behavior control. Further, since the noncontrol zone is established with a larger band width when the braking control by the rear wheel is applied and it is established with a smaller band width when the braking control by the front wheel is applied, the braking control by the rear wheel is restricted. Further, the return of the judging threshold value $\epsilon\Delta$ from the second threshold value $\epsilon\Delta S$ to the $\epsilon\Delta M$ is performed by the timer and the finishing signal of the control in an over-steer tendency. In this system, since the braking force applied to the rear wheel is restricted, the vehicle can be prevented from a slip when the rear wheel loses a side force due an excessive braking applied thereto on a road with a surface having low friction coefficient. Also, the vehicle driver is relieved of an anxiety due to an excessive turning around of the head of the vehicle. Further, since a most appropriate braking wheel is selected from among four wheels by judging the turning direction of the vehicle based on the actual yaw rate $\tau$, by judging the running state based on the yaw rate $\tau$ and the yaw rate deviation $\Delta\tau$ and by judging whether the vehicle is in an under-steer tendency or in an over-steer tendency, the vehicle can be prevented securedly from spins or drift-outs during cornering.

In summary, according to the present invention, since the estimated control values are calculated based on predetermined running conditions and the vehicle behavior is corrected by this calculated control value, the follow-up characteristic and the responseability of the system can be enhanced. Further, it is possible for the vehicle driver to operate the vehicle with a natural vehicle behavior. Furthermore, since the actual yaw rate value is not employed in calculating the control value, it is possible to correct the vehicle behavior with sufficient accuracy. Further, since the above running conditions are obtained from running conditions of the vehicle on a road with a surface having low friction coefficient, it is possible to calculate optimum estimated control values in most cases. Further, since the braking control on the rear wheel is restricted, it is possible to prevent the rear wheel from coming into a side slip due to an excessive braking being applied to the rear wheel.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A braking force control system of a vehicle, having a front wheel, a rear wheel, a front wheel cylinder for said front wheel, a rear wheel cylinder for said rear wheel and a brake drive apparatus for supplying and controlling a brake pressure to said front wheel cylinder and said rear wheel cylinder, vehicle speed detecting means for detecting a vehicle speed, and steering angle detecting means for detecting a steering angle, comprising:

target yaw rate gain calculating means for calculating a target yaw rate gain based on said vehicle speed;

actual yaw rate detecting means for detecting an actual yaw rate;

target yaw rate calculating means for calculating a target yaw rate based on said vehicle speed, said steering angle and said target yaw rate gain;

estimated yaw rate gain calculating means for calculating an estimated yaw rate gain based on said vehicle speed;

estimated yaw rate calculating means for calculating an estimated yaw rate under an estimated running condition based on said estimated yaw rate gain and said steering angle;

target yaw rate differential calculating means for calculating a target yaw rate differential;

estimated yaw rate differential calculating means for calculating an estimated yaw rate differential;

yaw rate differential deviation calculating means for calculating a yaw rate differential deviation of said target yaw rate differential and said estimated yaw rate differential;

first target braking force calculating means for calculating a first target braking force for said front wheel and a first target braking force for said rear wheel respectively based on said yaw rate differential deviation;

yaw rate deviation calculating means for calculating a yaw rate deviation of said actual yaw rate and said target yaw rate;

second target braking force calculating means for calculating a second target braking force for said front wheel and a second target braking force for said rear wheel respectively based on said yaw rate deviation, said steering angle, said target yaw rate gain, said vehicle speed and said actual yaw rate;

final target braking force calculating means for calculating a final target braking force for said front wheel based on said first target braking force for said front wheel and said second target braking force for said front wheel and for calculating a final target braking force for said rear wheel based on said first target braking force for said rear wheel and second target braking force for said rear wheel;

braking wheel determining means for determining a braking wheel based on said actual yaw rate and said yaw rate deviation such that said rear wheel on the side of a turning center is selected when said actual yaw rate differs from said yaw rate deviation in sign and such that said front wheel on the opposite side of a turning center is selected when said actual yaw rate agrees with said yaw rate deviation in sign;

output judging means for determining a judging threshold value of said yaw rate deviation and for judging whether or not said yaw rate deviation is in a control zone by comparing said yaw rate with said judging threshold value; and brake signal outputting means for outputting a brake signal to said brake drive apparatus so as to apply said final target braking force to said braking wheel.

2. The braking force control system according to claim 1, wherein
said estimated running condition is a running condition on a road having a low friction coefficient between a road surface and a tire.

3. The braking force control system according to claim 1, wherein
said first target braking force calculating means comprises, calculating a first front wheel theoretical braking force and a first rear wheel theoretical braking force based on said yaw rate differential deviation, calculating said first target braking force for said front wheel by way of multiplying said first front wheel theoretical braking force by a first large gain, and calculating said first target braking force for said rear wheel by way of multiplying said first rear wheel theoretical braking force by a first small gain.

4. The braking force control system according to claim 1, wherein
said second target braking force calculating means comprises, calculating a second front wheel theoretical braking force and a second rear wheel theoretical braking force based on said yaw rate deviation, said target yaw rate gain, said actual yaw rate and said vehicle speed, calculating said second target braking force for said front wheel by way of multiplying said second front wheel theoretical braking force by a second large gain, and calculating said second target braking force for said rear wheel by way of multiplying said second rear wheel theoretical braking force by a second small gain.

5. The braking force control system according to claim 1, wherein
said judging threshold value comprises a first threshold value and a second threshold value and said first threshold value is larger than said second threshold value.

6. The braking force control system according to claim 5, wherein
either said first threshold value or said second threshold value is selectively used for said judging threshold value according to a sign of said yaw rate deviation.

7. The braking force control system according to claim 5, wherein
said first threshold value and said second threshold value both become small with an increase of said vehicle speed.

8. The braking force control system according to claim 5, wherein
said first threshold value becomes small with an increase of said vehicle speed and said second threshold value is constant with respect to said vehicle speed.

9. The braking force control system according to claim 5, wherein
said first threshold value is constant with respect to said vehicle speed and said second threshold value becomes small with an increase of said vehicle speed.

10. A braking force control method of a vehicle, having a front wheel, a rear wheel, a front wheel cylinder for said front wheel, a rear wheel cylinder for said rear wheel and a brake drive apparatus for supplying and controlling a brake pressure to said front wheel cylinder and said rear wheel cylinder, comprising the steps of:

detecting a vehicle speed;

detecting a steering angle;

calculating a target yaw rate gain based on said vehicle speed;

detecting an actual yaw rate;

calculating a target yaw rate based on said vehicle speed, said steering angle and said target yaw rate gain;

calculating an estimated yaw rate gain based on said vehicle speed;

calculating an estimated yaw rate under an estimated running condition based on said estimated yaw rate gain and said steering angle;

calculating a target yaw rate differential;

calculating an estimated yaw rate differential;

calculating a yaw rate differential deviation of said target yaw rate differential and said estimated yaw rate differential;

calculating a first target braking force for said front wheel and a first target braking force for said rear wheel respectively based on said yaw rate differential deviation;

calculating a yaw rate deviation of said actual yaw rate and said target yaw rate;

calculating a second target braking force for said front wheel and a second target braking force for said rear wheel respectively based on said yaw rate deviation, said target yaw rate gain, said vehicle speed and said actual yaw rate;

calculating a final target braking force for said front wheel based on said first target braking force for said front wheel and said second target braking force for said front wheel and calculating a final target braking force for said rear wheel based on said first target braking force for said rear heel and second target braking force for said rear wheel;

determining a braking wheel such that said rear wheel on the side of a turning center is selected as said braking wheel when said actual yaw rate differs from said yaw rate deviation in a sign thereof and such that said front wheel on the opposite side of a turning center is selected as said braking wheel when said actual yaw rate agrees with said yaw rate deviation in a sign thereof;

determining a judging threshold value of said yaw rate deviation and judging whether or not said yaw rate deviation is in a control zone by comparing said yaw rate with said judging threshold value; and outputting a brake signal to said brake drive apparatus so as to apply said final target braking force to said braking wheel.

* * * * *